United States Patent
Korpi et al.

[11] Patent Number: 6,092,827
[45] Date of Patent: Jul. 25, 2000

[54] TOWING PINTLE EXTENDER DEVICE

[75] Inventors: John G. Korpi; Christopher J. Bensch, both of Livonia; Kenneth A. Greene, Walled Lake; Richard J. Line, Sterling Heights; Peter W. Pfister, South Lyon, all of Mich.

[73] Assignee: The United States of America as represented by the Secretary of the Army, Washington, D.C.

[21] Appl. No.: 09/208,153

[22] Filed: Nov. 9, 1998

[51] Int. Cl.$^7$ ...................................................... B60T 17/04
[52] U.S. Cl. ........................................ 280/514; 280/491.1
[58] Field of Search .................................. 280/504, 514, 280/515, 491.1, 491.3, 491.5

[56] References Cited

U.S. PATENT DOCUMENTS

| | | | |
|---|---|---|---|
| 2,183,478 | 12/1939 | Holmes et al. | 280/491.1 |
| 2,378,504 | 6/1945 | Roos | 280/491.3 |
| 2,512,733 | 6/1950 | Andersen et al. | 280/491.1 |
| 2,687,900 | 8/1954 | Thomas | 280/515 |
| 3,113,684 | 12/1963 | Novotney | 280/491.1 |
| 3,252,716 | 5/1966 | Gaterman | 280/491.1 |
| 3,627,352 | 12/1971 | Canole | 280/491.3 |
| 4,222,583 | 9/1980 | Schillings | 280/491.3 |
| 5,624,137 | 4/1997 | Lesesne | 280/514 |

FOREIGN PATENT DOCUMENTS

| | | | |
|---|---|---|---|
| 1193817 | 5/1965 | Germany | 280/504 |
| 3737848 | 5/1989 | Germany | 280/504 |
| 2207103 | 1/1989 | United Kingdom | 280/504 |

*Primary Examiner*—Kevin Hurley
*Assistant Examiner*—Elaine Gort
*Attorney, Agent, or Firm*—David L. Kuhn; Peter A. Taucher

[57] ABSTRACT

A modified pintle assembly for an armored personnel carrier is secured to a swingable ramp at the rear of the carrier. The assembly comprises a back plate affixed facially on the ramp and dogleg plates fixed to the back plate. The dogleg plates pivot on one of the ramp's hinges. A downwardly open shroud is fixed to the back plate and elongate plates. The shroud accommodates an extension block. An inner end of an extension block fits closely within the shroud and is pivotally connected thereto. A pintle is attached to the outer, free end of the extension block. The extension block and pintle are movable together between a deployed position in which the they extend away from the ramp and a retracted position in which they lie along the ramp. A lock pin through the shroud retains the extension block and pintle in either the deployed or the retracted position.

4 Claims, 3 Drawing Sheets

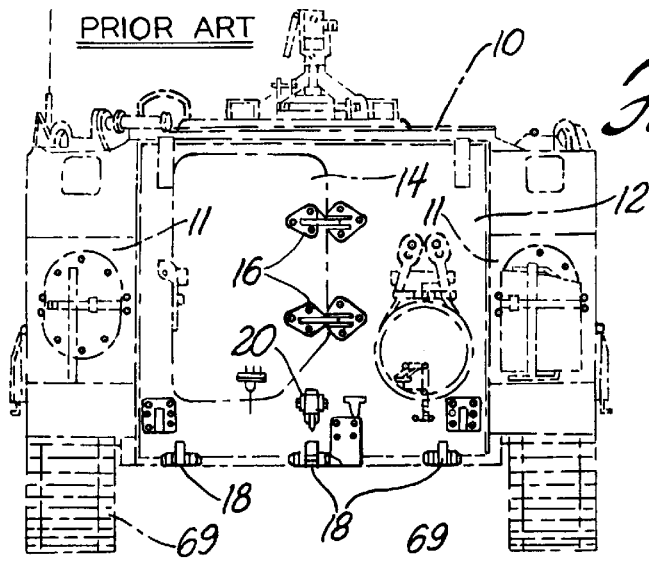
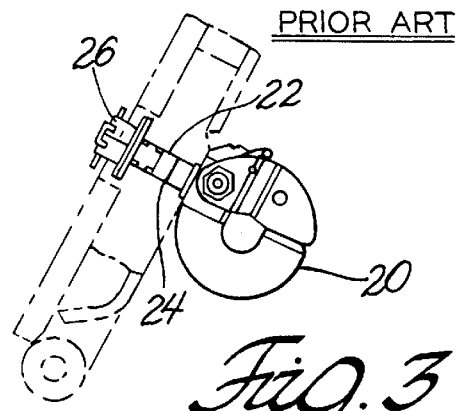
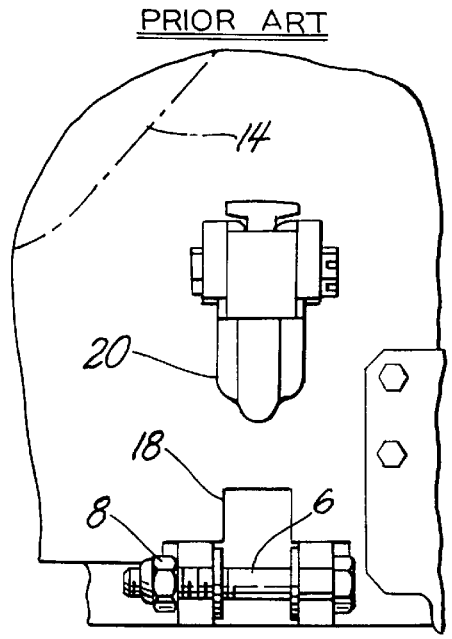
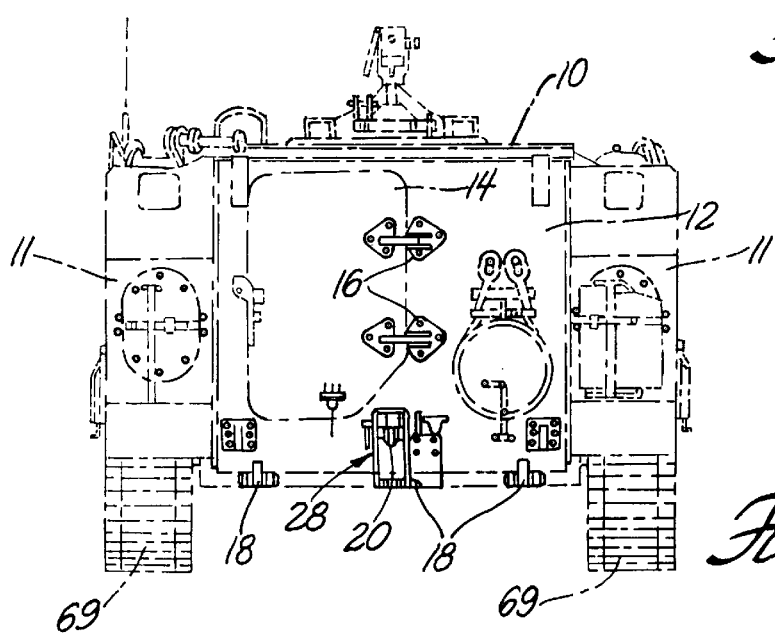

TOWING PINTLE EXTENDER DEVICE

GOVERNMENT USE

The invention described here may be made, used and licensed by or for the U.S. Government for governmental purposes without paying us any royalty.

BACKGROUND

For a variety of ground based military operations, prime movers such as tanks or armored personnel carriers, as well as trucks and the like, are required to tow trailers and other vehicles. Towing by prime movers is typically done over rough terrain and subject to the associated difficulties. Also, add-on components, such as armored fuel tanks, are often fitted to the rear of the prime movers. These components hinder the prime movers' ability to turn when towing another vehicle. Special tow bars can be used to connect towed vehicles to prime movers, but these tow bars interfere with the opening of doors, hatches or ramp ways on the prime movers.

We facilitate using prime movers to tow vehicles by our assembly of a new pintle extender with a standard military pintle. Our extender has a deployed position and a retracted position. In the deployed configuration, the extender places the pintle further rearward of the prime mover than add-on components attached thereto. In the retracted configuration, our extender allows a ramp, door or hatch cover to be opened or closed. In either configuration, the extender is disposed so as to have minimal risk of contacting the ground even when the prime mover traverses rough terrain. Further, the extender's design minimizes the new hardware and modifications to the prime mover needed to accommodate installation.

SUMMARY OF THE INVENTION

Our modified pintle assembly is secured to a swingable ramp or like member at the rear of a prime mover, which can be an armored personnel carrier. The assembly comprises a back plate affixed to the ramp at a pre-existing aperture in the ramp. Fixed to the back plate are dogleg plates pivoted to one of the ramp's hinges. Fixed to both the back plate and dogleg plates is a partly open shroud, which accommodates an extension block. An inner end of an extension plate fits closely within, and is pivotally connected to, the shroud. The outer, free end of the extension block accepts the pintle. The extension block and pintle move between a deployed position where they extend out from the ramp and a retracted position where they lie along the ramp. A lock pin through the shroud keeps the extension block and pintle in either the deployed or the retracted position.

BRIEF DESCRIPTION OF THE DRAWINGS

FIG. 1 is a rear elevational view of an armored personnel carrier having a standard pintle conventionally mounted thereon.

FIG. 2 is a close up view of the pintle installation in FIG. 1.

FIG. 3 is a side elevational view of a pintle with the neighboring ramp structure shown in phantom.

FIG. 4 is a rear elevational view of the armored personnel carrier having the assembly of our pintle extender and the standard pintle.

DETAILED DESCRIPTION

Figure 5:
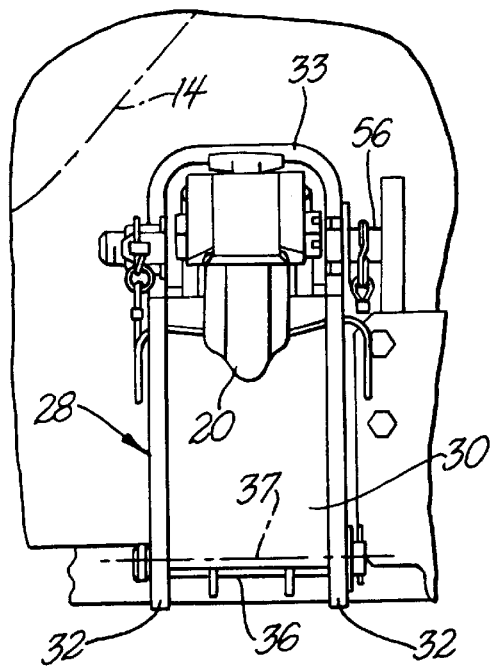
FIG. 5 is a close up view of the assembly of the pintle extender and the pintle shown in FIG. 4.

Shown in FIG. 1 is a rear view of an armored personnel carrier 10 now in use by the United States Army, the particular version shown being the M113A3. Carrier 10 has a ramp 12 that covers the aft end of the carrier's hull and may be regarded as the rear wall of the carrier. In ramp 12 is a door 14 that swings out from carrier 10 on hinges 16. Ramp 12 is swingably connected to the hull of carrier 10 by means of three hinges 18 disposed along the its bottom edge. When ramp 12 is swung down fully, its upper edge lies on the ground, so that the ramp provides an incline to facilitate entry or egress of soldiers or equipment in carrier 10.

A conventional towing pintle assembly 20 is mounted at a middle lower zone of the ramp. As seen in FIG. 3, pintle assembly 20 has a shaft 22 that fits closely through a complementary aperture 24 in the wall of ramp 12. Nut 26 threads onto shaft 22 so as to retain pintle assembly 20 on ramp 12. Typically, carrier 10 has 45 gallon armored supplementary fuel tanks 11 attached to the its rear, and pintle 20 is recessed inboard of the carrier relative to the fuel tanks by approximately one and one-half feet. Hence fuel tanks 11 tend to limit the swing of trailer tongues (not shown) engaged with the pintle.

Figure 6:
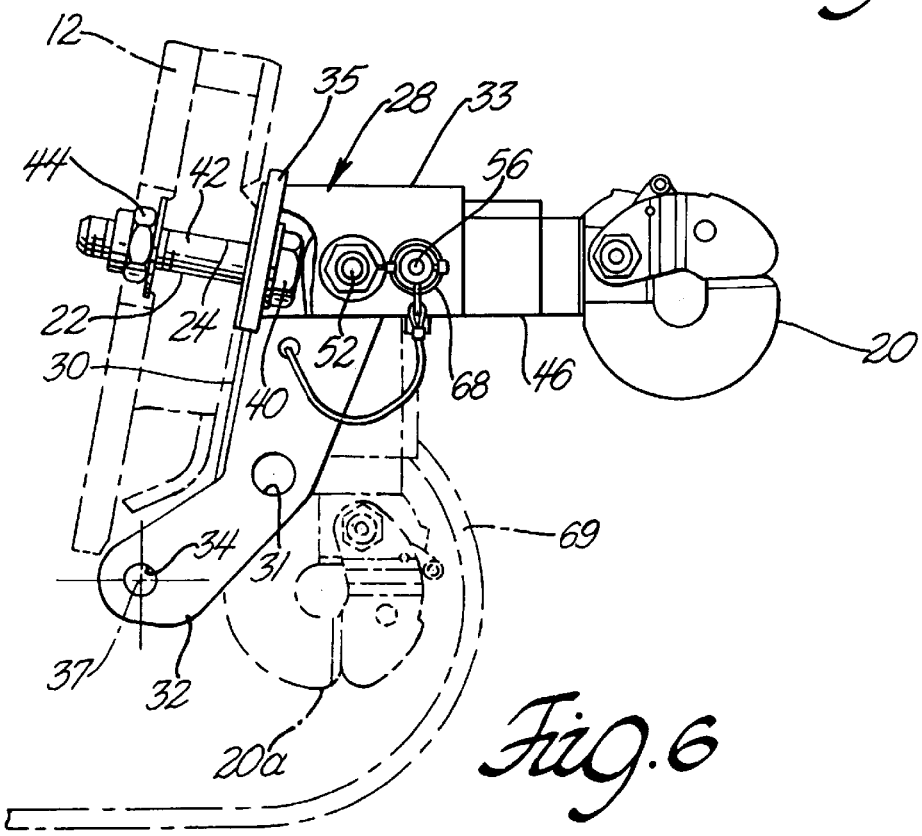
FIG. 6 is a side elevational view of the pintle extender and the pintle, with neighboring parts of the armored personnel carrier being shown in phantom.
Figure 9:
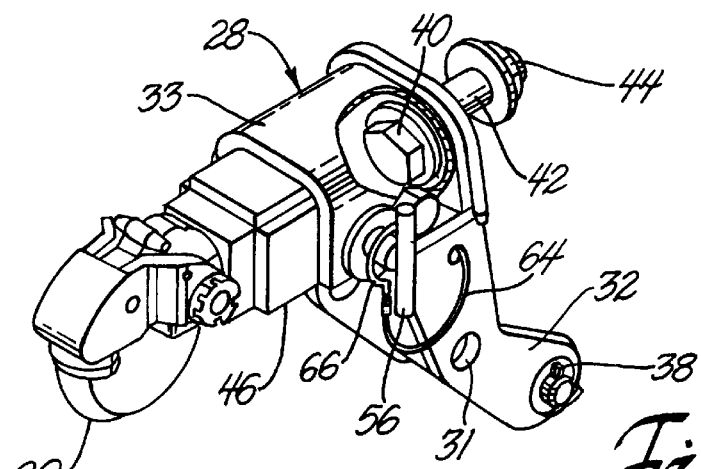
FIGS. 9 and 10 are perspective views of the assembly of the pintle extender with the pintle.
Figure 10:
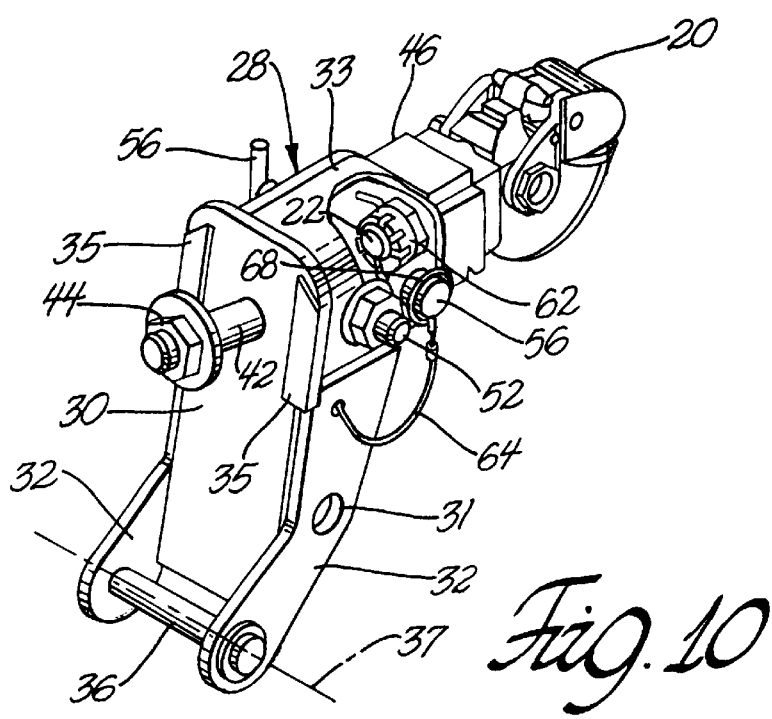

FIGS. 4 and 5 show armored personnel carrier 10 having a modified pintle assembly comprised of pintle extender 28 and pintle 20, the extender being affixed to ramp 12 and receiving pintle 20. FIGS. 6, 9 and 10 show extender 28 in greater detail. As perhaps best seen in FIG. 10, extender 28 includes a back plate subassembly comprised of a back plate 30 and includes a pair of dogleg plates 32 welded to the back plate. A shroud 33 having the general shape of a downwardly open channel is welded to the back plate above the dogleg plates. A pair of spacers 35 is also fixed to the back plate on the side opposite shroud 33. The spacers provide clearance between back plate 30 and the ramp 12 in ares where there is weld build up on the exterior ramp surface. The dogleg plates also define apertures 31 to accommodate safety chains connected to trailers or other vehicles that armored personnel carrier 10 may be towing.

Figure 7:
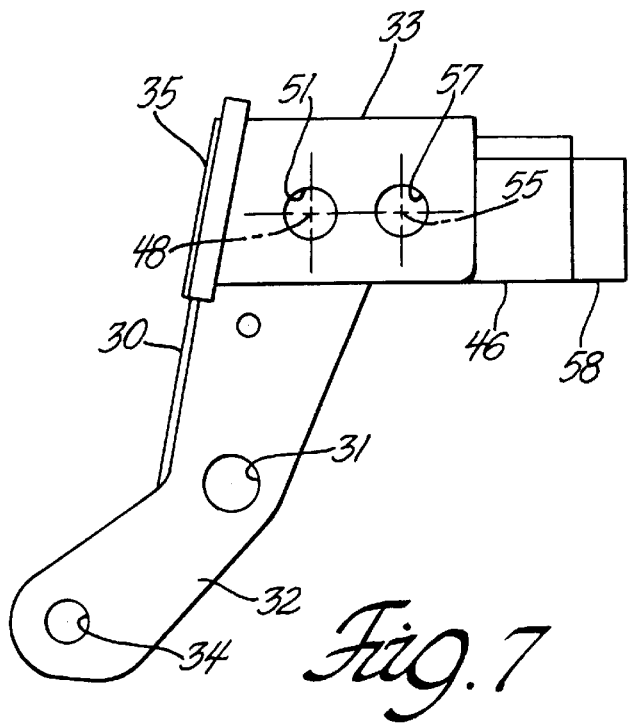
FIG. 7 is a side elevational view of the pintle extender alone.

At the lower ends of the dogleg plates are pin apertures 34 (FIG. 7) through which hinge pin 36 is inserted on axis 37. The lower ends of dog leg plates 32 fit over the center ramp hinge 18 once the pre-existing pin 6 (FIG. 2) and nut 8 are removed. Hinge pin 36 passes through apertures 34 and central ramp hinge 18 along axis 37. Pin 36 is held in place by a cotter pin 38 (FIG. 9). By this construction, pintle extender 28 can swing with ramp 12 about axis 37 of the central ramp hinge 18. Pintle extender 28 is held in fixed relation to ramp 12 by means of a cap screw whose head 40 is within shroud 33 and whose shank 42 passes through back plate 30 and through ramp 12. A suitable nut 44 engages the threaded end of shank 42.

Figure 8:
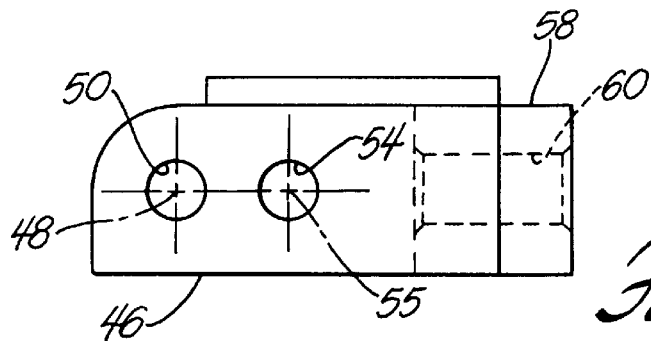
FIG. 8 is a side elevational view of an extension block that forms part of the pintle extender.

Pivoted to shroud 33 about axis 48 is an open bottomed extension block 46 shown in FIG. 8. The pivoted, or inner, end of block 46 fits closely within the shroud. Concentric with axis 48 is a pair of apertures 50, which register with complimentary apertures 51 of shroud 33. Apertures 50 and 51 accommodate an axis pin 52 (FIG. 6) that passes through both block 46 and shroud 33. Extension block 46 defines a second pair of apertures 54, which are centered on axis 55. Apertures 54 register with complimentary apertures 57 (FIG. 7) in shroud 33 when pintle extender is in the position shown in FIGS. 6, 7, 9 and 10. Apertures 54 receive the shank of T-handle lock pin 56, as do the complimentary 55 shroud apertures in FIGS. 6,7,9 and 10. Additionally, extension block 46 has a pintle receiving block 58 defining through bore 60 for receiving shaft 22 of towing pintle 20 (FIG. 3) and thereby attaching pintle 20 to pintle extender 28. A castle nut 62 or similar threaded member inside block 46 retains shaft 22 in pintle receiving block 58.

It is preferred that the T-handle of pin 56 be on the side of extender 28 further from door 14, so that the T-handle does not interfere with the outward swing of that door. It is also preferred that pin 56 be retained on extender 28 by means of a lanyard 64 passing through holes in dog leg plates 32. The lanyard attaches to a ring 66 encircling the pin near the pin's T-handle and attaches to a linchpin mechanism 68 engaging pin 56 at the end opposite from the T-handle.

In FIG. 6, Pintle extender 28 is in its horizontal, deployed position such that pintle can be connected to a trailer or other vehicle to be towed. T-handle lock pin 56 passes through apertures 54 in extension block 46 and the complimentary holes in shroud 33 so that extender 28 and pintle 20 are locked in the deployed position. Lock pin 56 can be removed and then extender 28 and pintle 20 can be swung down to the vertical, retracted position shown in dashed lines in FIG. 6. During the retracted position the pintle and extender do not interfere with, and are not harmed by, downward swinging of ramp 12.

From FIGS. 1 and 3 it can be discerned that carrier 19 is a track laying vehicle having two sets of tracks 69. A side view of the aft section of one of the tracks is shown in phantom silhouette fashion in FIG. 6. There, it can be seen that pintle 20, during its retracted or vertical position 20a, protrudes obliquely out from the carrier, in a downward-rearward direction, to a lesser extent than do tracks 69. Thus, when carrier 10 encounters a sharp terrain incline or decline during off-road travel, tracks 69 will prevent contact of a retracted pintle 20 with the ground.

We wish it to be understood that we do not desire to be limited to the exact details of construction or method shown herein since obvious modifications will occur to those skilled in the relevant arts without departing from the spirit and scope of the following claims.

What is claimed is:

1. A modified pintle assembly for a vehicle having hinges and
  a ramp swingable on the hinges, the modified assembly comprising:
  a back plate;
  means for securing the back plate against the ramp;
  elongate plates fixed to the back plate, the elongate plates pivotally engaged to one of the hinges;
  a shroud fixed to the back plate and to the elongate plates, the shroud having the general shape of a downwardly open channel;
  wherein the shroud defines a first pair of shroud apertures and a second pair of shroud apertures;
  an extension block having one end fitting closely within the shroud;
  wherein the extension block defines a first pair of block apertures and a second pair of block apertures;
  an axis pin extending through the first shroud apertures and the first block apertures, the extension block swingable relative to the shroud about the axis pin;
  wherein the pintle is engaged to a free end of the extension block;
  the extension block movable between a deployed position relative to the shroud wherein the extension block and the pintle extend away from the ramp and a retracted position relative to the shroud wherein the extension block and pintle lie along the ramp; and
  a lock pin passing through the second shroud apertures, thereby locking the extension block in one of the positions relative to the shroud.

2. The assembly of claim 1 wherein the securing means comprises a screw having a screw head disposed within the shroud and having an elongate portion passing through the back plate and the ramp.

3. The assembly of claim 1 wherein the pintle has a shank attached thereto and the extension block comprises:
  a downwardly open channel-like body pivoted to the shroud; and
  a pintle receiving bock fixed to the channel like body and disposed outside the shroud;
  the receiving block defining a though bore accommodating the shank.

4. A modified pintle assembly for a vehicle having tracks and further having hinges and a ramp swingable on the hinges, the modified assembly comprising:
  a back plate;
  a pair of parallel dogleg plates fixed to the back plate, the dogleg plates pivotally engaged to one of the hinges;
  a shroud fixed to the back plate and to the dogleg plates, the shroud having the general shape of a downwardly open channel;
  means for securing the back plate against the ramp, the securing means disposed partly within the shroud and the vehicle.
  wherein the shroud defines a first pair of shroud apertures and a second pair of shroud apertures;
  an extension block having one end fitting closely within the shroud;
  wherein the extension block defines a first pair of block apertures and a second pair of block apertures;
  an axis pin extending through the first shroud apertures and the first block apertures, the extension block swingable relative to the shroud about the axis pin.

* * * * *